Jan. 7, 1958  J. X. KHYM ET AL  2,818,851
SEPARATION AND ANALYSIS OF POLYHYDROXY SUBSTANCES
Original Filed July 1, 1952  7 Sheets-Sheet 1

INVENTORS
JOSEPH X. KHYM
LEONARD P. ZILL

BY
ATTORNEYS

INVENTORS
JOSEPH X. KHYM
LEONARD P. ZILL
BY *Mason, Mason & Sheridan*
ATTORNEYS

FIG. 11.

Jan. 7, 1958  J. X. KHYM ET AL  2,818,851
SEPARATION AND ANALYSIS OF POLYHYDROXY SUBSTANCES
Original Filed July 1, 1952  7 Sheets-Sheet 6

FIG. 12.

INVENTORS
JOSEPH X. RHYM
LEONARD P. ZILL
ATTORNEYS

2,818,851

SEPARATION AND ANALYSIS OF POLYHYDROXY SUBSTANCES

Joseph X. Khym and Leonard P. Zill, Oak Ridge, Tenn.

Continuation of application Serial No. 296,588, July 1, 1952. This application February 7, 1956, Serial No. 563,869

20 Claims. (Cl. 127—55)

This invention relates to a method for the separation and analysis of polyhydroxy substances, and more particularly those having two or more OH groups on the same side of the molecule as represented by Fisher projection formulas or those compounds which can form such a configuration through the mechanism of mutarotation, and especially relates to a method of separation and analysis of sugars, sugar alcohols, glycosides, etc. that fall into that class of compounds.

Th methods formerly used have, in general, been based upon absorptive chromatography and both columnar and paper chromatography. In many cases, they are non-quantitative, or are difficult or impossible to apply to preparative isolations, or to large scale operations, and such prior art methods include undesirable manipulative procedures and chemical conversions.

THE STATUS OF SUGAR ANALYSIS

Insofar as the analysis of individual pure sugar samples is concerned there is no problem. There are a number of separate methods—colorimetric, polarimetric, volumetric, gravimetric and potentiometric—that can adequately serve for the quantitative analysis of single sugars. The problem becomes increasingly difficult, however, when two or more sugars are to be analyzed. If one knows which sugars are present in a sample, it is generally possible to device a scheme that will serve to quantitatively determine the composition of the mixture. When dealing with biological samples, where it is generally impossible to have more than a rough idea of the sugars present, quantitative analysis becomes extremely difficult.

A significant advance was made in this latter field of the analysis of biological samples with the development of paper chromatography. This method enables one to qualitatively determine the sugars present in a mixture. With certain modifications, the method can be used quantitatively. Because of the difficulty of locating the sugar areas on the paper, unless one uses a radioactive tracer, the separation and analysis of sugar mixtures containing more than four or five sugars is not practical. The method also suffers from the fact that sugars present in low concentration in a sugar mixture are often missed.

There are methods for making group separations of sugars by partition and absorption chromatography. The methods are not quantitative and, when handling biological samples, not especially qualitative. For best results by these methods it is generally necessary to prepare derivatives of the sugars to obtain the maximum degree of separation.

In conclusion it can be stated that there are adequate methods for analyzing pure samples of single sugars or of known mixtures if not too complex. When handling complex mixtures of biological origin, however, the present methods are not entirely satisfactory.

It is an object of this invention to provide a process for the separation, preparation, and identification of sugars and related compounds.

Other objects will be apparent from the following description.

In the drawings Figures 1 to 13 inclusive show graphs illustrating the examples hereinafter to be described.

The maximum quantity of material than can be handled is only limited by the size of equipment, while the minimum quantity is limited only by the method of analysis.

When substances are separated by ion exchange, it is essential that conditions be found under which each substance exhibits a different degree of affinity for the exchanger.

In forming various polyhydroxy-borate complex ions and subsequently separating them by means of an ion exchanger, we have found the conditions under which their individual affinities for the exchanger may be varied so that sharp separations are possible.

The formation of acidic borate complex ions from the reaction between borate and various polyhydroxy compounds in aqueous solutions is well known. The affinity between a particular ion exchanger and these complex ions is determined chiefly by their ionic properties. The ionization constants of the various polyhydroxy-borate complex ions for any given concentration under set conditions is, of course, fixed and uncontrollable. However, it has been found that the degree of complex ion formation may be advantageously controlled by the borate ion concentration which, in turn, is controlled by the molarity of the borate ions and/or the pH of the solution under consideration.

Thus by increasing the pH of the solution and/or increasing the molarity of borate ions, the concentration of the borate ion can be progressively increased to an extent whereby polyhydroxy-borate complex ions once sorbed on ion exchange resins can be de-sorbed and thus desired separations can be made.

In general it may be said that as the pH of the solution increases above 7, the equilibrium of the equation illustrated below, whereby [P] represents the concentration of a particular polyhydroxy substance and [B]$^-$ represents borate ion concentration, is shifted to the right favoring the formation of the complex ion [PB]$^-$ $$[P]+[B]^-=[PB]^-$$

In the ion-exchange chromatographic separations herein described, the distribution coefficients of various polyhydroxyborate complex ions, where coefficients are governed almost exclusively by the degree to which these complex ions are formed, it is obvious that the concentration of borate ions is instrumental in enabling sharp separations to occur.

When polyhydroxy-borate complex ions are passed through a resin column exchanger of the type described herein, the reaction between the complex ions and the exchanger proceeds until an equilibrium is reached.

Thus, it can be shown that the borate ion concentration determines the extent of equilibria between the various polyhydroxy substances and the borate ions to form the complex ions and the concentrations of the complex ions, in turn, control the equilibria between the various complex ions so formed, and the exchanger.

As stated above, the concentration of the borate ions is controllable in several ways and is believed to be the simplest method of exploiting the differences—(1) In the degree to which various polyhydroxy substances will react with borate ions to form complex ions and—(2) The affinities of the various complex ions so formed for a given resin ion exchanger.

The structural characteristics of the various polyhydroxy substances that determines the ease with which they react with borate ions to form complex ions and the structural characteristics of the complex ions so formed which determine the degree of affinity which each complex ion exhibits toward an ion exchanger is not fully known. However, information concerning the nature of these various compounds, derived from the measurements of changes in optical rotation, conductivity, acidity, freezing point and solubility, indicates that many well known structural characteristics are involved.

While we have stated that various polyhydroxy substances may be separated in view of our findings, we are concerned with those sugars, sugar alcohols, and glycosides principally obtained from plant sources. Our discussion will be limited to complex mixtures containing many of these various carbohydrates, although there is every reason to believe that many other polyhydroxy substances can be satisfactorily separated by the broad method disclosed in our previous application Serial No. 296,588, filed July 1, 1952, now abandoned, of which this application is a continuation.

Referring again to the structures of the individual substances to be separated, the degree to which a given sugar or sugar alcohol will combine with a given concentration of borate ion under set conditions is determined by the structure and configuration of the sugar or sugar alcohol.

In order to attract and combine with borate ions, the sugars or sugar alcohols must have at least one hydroxyl group within a certain distance of a second hydroxyl group. It is elementary that many of the sugars in dilute aqueous solutions can exist in many isomeric forms such as open chain structures and various sized carbohydrate ring systems of which the five-membered (furanoid) and the six-membered (pyranoid) are of special interest to our discussion, although permanently open chain compounds such as the sugar alcohols also react with borate ions to give ionized borate complexes. A pair of hydroxyl groups adjacent to each other in the ring structures may be either cis or trans in configuration.

Without discussing the complete theory, suffice to say that adjacent cis hydroxyl groups in a furanoid ring have a greater affinity for borate complex ion formation than adjacent cis hydroxyl groups in a pyranoid ring. Many of the trans isomers do not exhibit any decided attraction for borate ions since the hydroxyl groups are not in proper relative positions to form sugar-borate diols. However, ring distortion may place two hydroxyl groups in proper position so that sugar-borate diols in trans isomers of some pyranoid oxide rings may be readily formed. Other factors include forces of different types and strengths that act between substituent atoms of the various sugar and sugar alcohol molecules that may stabilize or labilize any of the numerous configurations that the molecules assume. These and other inherent structural differences dictate the varying affinities between the individual sugars, sugar alcohols and glycosides for borate complex ion formation which enables complex ion formation between sugars and sugar alcohols and borate ions. By increasing the concentration of borate ions by the means already discussed, the individual sugars, sugar alcohols and glycosides form complex ions in a progressive manner, i. e., an individual sugar or sugar alcohol will enter into a complex ion formation when a certain concentration of borate ions is reached while the other polyhydroxy substances require a greater borate ion concentration before complexing to any extent.

Not all of the glycosides react with borate ions simply because the two OH groups must be within proper distance to complex with borate ions. Of course those glycosides that do not form complex ions can be readily separated from those other polyhydroxy substances that are in complex ion formation. Glycosides having an aromatic moiety exhibit more affinity for an ion exchanger than aliphatic glycosides.

We have stated that the extent to which the equilibrium $$[P] + [B]^- = [PB]^-$$

proceeds is important. Other equilibria are believed to be dependent thereon and affect vitally the separating process. The equilibrium established in the reaction between the various complex ions and the ion exchanger is of paramount importance and depends on the degree to which individual polyhydroxy-borate complex ions are attracted and sorbed on the exchanger as well as to the concentration of the complex ions. These, in turn, dictate the conditions under which successful elutions of the complex ions are carried out.

Evidence suggests that many of the sugars can combine with borate ions to form various types of diols represented as follows:

The various diols of any given sugar or sugar alcohol are believed to be in equilibrium with one another and the equilibrium depends on pH, ratio of borate to sugar or sugar alcohol and the absolute concentration of the sugar.

When a solution containing borate ions and the polyhydroxy substances to be separated is contacted with an anion exchange resin, those diols which are strongly attracted to the resin will tend to become sorbed thereon. Evidence indicates that diols of types II and III have a high affinity for an anion resin exchanger presumably by reason of their relatively high ionization constants.

In the separation of monosaccharides in dilute solutions containing a high ratio of borate ions to the monosaccharides, borate-diols of type II are believed to predominate. In the separation of some of the disaccharides from the same type of solution, borate-diols of type I are believed to predominate and have a lesser attraction for the anion exchange resin. In the separation of trisaccharides and tetrasaccharides, in similar solutions where the ratio of borate ion concentration to the concentrations of the saccharides is relatively high, the predominating borate diols are not fully known, since the complexity of these structures enables a multitude of factors to influence complex ion formation. For instance, stachyose, a tetrasaccharide, complexed with borate ions appears to have more affinity for an anion resin exchanger than raffinose, a trisaccharide, but less affinity than gentiobiose, a disaccharide, in the same solution, as indicated in the following separation table:

*Table I.—Elution order of various sugars*

Column size: 0.85 sq. cm. x 11 cm. strong-base anion resin (Dowex–1 converted to a substantial borate form); eluting agent, 0.015 M $K_2B_4O_7$ with the exception of raffinose which was 0.005 M $K_2B_4O_7$.

Volume-to-peak (ml.) value

Sugar:
  Raffinose _____________________________ 320
  Rhamnose _____________________________ 170
  Stachyose ____________________________ 200
  Sorbose ______________________________ 1580
  Gentiobiose __________________________ 5000
  Meliobiose ___________________________ 7000

Resin ca. 300 mesh. Eluting agents at rate of

In the separation of sugar alcohols under similar conditions, the strong affinity that many of these compounds, complexed by borate ions, show for an anion exchange resin, indicates that a di-diol is formed and four hydroxyl groups instead of two are combined with borate to form a bivalent ion in aqueous solutions (similar to type III).

Since the attractions between the various borate-complexed sugars and sugar alcohols and the anion resin exchanger determines their respective eluting positions, we believe that the short discussion of the theories relating to the structural characteristics will enable those skilled in the art to predict the approximate conditions under which many possible separations, not specifically set forth in our present disclosure, occur and additional applications will suggest themselves.

The particular orders of elution of the sugars and sugar alcohols suggest that several factors which affect the affinity of the borate complex ions of these substances for the exchanger are involved. Mutarotation and furanose-pyranose interconversions, as well as structural characteristics that enable open chain structures to permanently assume that configuration (e. g. sugar alcohols) are undoubtedly important as to the degree of formation of the sugar and sugar alcohol diols as well as the types of diols assumed by these substances.

In practice, a highly ionized borate salt is added to a dilute aqueous solution containing a mixture of the polyhydroxy substances to be separated.

The solution is then run in an anion resin exchange column of the type described herein so that the polyhydroxy borate complex ions have the opportunity to be sorbed on the column. The column is then eluted with an aqueous solution containing borate ions in varying concentration. As stated before, the concentration of borate ion may be increased by simply increasing the molarity of a highly ionized borate saline solution or by increasing the pH of the eluting solution.

By using proper physical or chemical methods, identification of the polyhydroxy substances in the effluent is possible. As the borate ion concentration is progressively increased and/or the volume of the eluting solution is increased, the various polyhydroxy-borate complex ions are individually and successively eluted. They are separately collected for quantitative assaying. Inasmuch as our method enables sharp separations to take place, quantitative determinations are, in many cases, exact and at the very least, they very closely approximate true values. The quantitative determinations may be easily carried out colorimetrically by the use of standard procedures.

Once the individual polyhydroxy-borate complex ions are isolated, the borate ions may be removed by treating the individual solutions with Dowex–50 (hydrogen form) to yield a boric acid solution of the sugar. This treatment should be made shortly after elution to prevent any decompositions of the polyhydroxy substances due to the alkaline condition of the solution. The Dowex–50 may be filtered out and the remaining solution can be vacuum distilled in the presence of methyl alcohol so as to remove the borate as volatile methyl borate. Water can be added to the sugars and the solution filtered to remove any impurities before crystallizing the sugars.

We have found that the best resin ion exchanger is of the strong base type such as Dowex–1 (quaternary ammonium derivative of polystyrene resin) or Amberlite IRA-400 similar to Dowex–1). These resin ion exchangers received from the manufacturer usually in the chloride form are preferably converted to a substantially borate form by first washing them free of fines by decantation, slurrying them into columns and washing the columns with an 1 N HCl solution. A 0.1 M $K_2B_4O_7$ solution is passed through the column until substantially all of the chloride ions have been removed. A water wash will then remove the excess borate.

The column is put in substantially the borate form so as to be less basic and have more affinity for the complex ions. It is preferred to employ the anion exchanger in the borate form, and to use dilute aqueous solutions of borate ions both to complex the polyhydroxy substances and to elute the columns. This is all a matter of technique and is easily understood by anyone working in the field. Although the sorption of polyhydroxy substances dissolved in water only can be passed through a column of the exchanger in the borate form and the substances complexed with borate ions while in the exchanger, the de-sorption step is the same as described above.

We have stated that in the preferred form of our invention the polyhydroxy substances are reacted in a dilute aqueous solution with borate ions. Water soluble borate compounds such as $K_2B_4O_7$ or $Na_2B_4O_7$, are suitable for complexing the polyhydroxy substances as well as forming the desired eluting solutions. Generally, the addition of these borate salts to water to form dilute aqueous borate solutions of the strengths cited in the examples will give a pH within the desired limits. All of our separations are carried out between the extreme ranges of the pH realized by a saturated $H_3BO_3$ solution and the pH realized by a saturated $H_3BO_3-K_2B_4O_7$ buffer solution at room temperature.

The preferred separations are carried out in aqueous solutions of polyhydroxy compounds which have been previously de-ionized although moderate amounts of inorganic salts and organic materials can be tolerated which do not interfere with the sorption or elution processes.

In fact, certain separations are benefited by traces of impurities, especially when the borate complexed substances to be separated exhibit a high degree of affinity for the resin column. Those impurities such as acetate, chloride, formate and sulfate ions often control the ease with which an aqueous borate solution will elute the complex ions sorbed on the resin column.

In some isolated cases, more than a trace of the impurities, amounting to the extent where the ratio of impurities to borate ions is high, in dilute aqueous eluting solutions, is desirable. This type of eluting solution finds particular application in the separation of those sugar phosphate esters which are strongly attracted to the resin columns of the types described herein, when the columns are converted to substantially the borate form as previously described.

We have already mentioned that those complexes that are strongly ionized exhibit marked affinity for the resin column. Many of the sugar phosphate esters exhibit a high degree of affinity for the exchangers because the phosphate groups in addition to some of the sugar-borate-diols formed are attracted to the column. For instance, ribose-5-phosphate and glucose-1-phosphate are difficult to remove from a substantially borated converted anion exchange resin of the type previously described. The preferable method of separating those sugar phosphate esters that combine with borate ions to form highly ionized complex ions is to convert the resin column to a sulfate or chloride form rather than the borate form and elute with a dilute aqueous solution containing borate and sulfate ions in the case of a sulfate form of resin column or borate and chloride ions in the case of a chloride resin column where the sulfate or chloride ions to borate ions is high. Clean separations between the aforementioned phosphates was obtained. However, without the presence of borate ions, no satisfactory separations can be made for quantitative purposes.

In general, it may be stated that the presence of minute amounts of impurities do not interfere with any phase of our process described herein. The presence of traces of impurities in dilute aqueous solutions containing borate ions affects to some extent the ease with which the elution of the complex ions may be carried out and in general eluting solutions that contain traces of impurities, such as those mentioned, do not require as high a concentration of borate ions to effect given separations as would normally be required if borate ions alone were present in the eluting solution. This factor may be of importance when the undesirable effect of excess alkalinity produced by a high concentration of borate ions is to be mitigated.

Sugar phosphate-borate complex ions and other highly ionized borate complex ions may be readily separated, using a relatively high ratio of impurities to borate ions in dilute eluting solutions.

The degree to which a given hydrolysis of higher saccharides proceeds in the presence of a small amount of acid may be accurately determined by our method of separation. The hydrolysis may be allowed to proceed to any extent and stopped by removing the remaining acid. The saccharides may then be complexed with borate ions and separated in accordance with the broad principles set forth in the present disclosure and the degree to which hydrolysis has proceeded can be correctly ascertained.

For instance, the degree of hydrolysis of melezitose by dilute acid was accurately determined when complete separations occurred by using our separation process. The elution order is indicated in the following table:

| | Sugar | Volume-to-peak (ml.) value |
|---|---|---|
| 0.015 M $K_2B_4O_7$ eluting solution | Melezitose | 275 |
| | Turanose | 1,300 |
| 0.03 M $K_2B_4O_7$ eluting solution (Begun after 2.8 liters of 0.012 M $K_2B_4O_7$ had been added) | Glucose | 2,900 |

Exchanger, 0.85 sq. cm. x 11 cm. strong-base anion resin (Dowex-1) ca. 300 mesh, borate form eluting agent at 1 ml./min.

Any fructose produced by hydrolytic cleavage of turanose will be eluted in some position under conditions set forth above. A clean separation of these two sugars may be achieved by recycling and eluting turanose with 0.1 M $H_3BO_3$ at low pH and then eluting fructose with 0.1 M $K_2B_4O_7$.

Referring now to the process for eluting the complex ions from the resin column exchangers, those ions which are more highly attracted to the exchangers are more difficult to remove by elution. Progressive elution of the various complex ions in elution orders from the columns is accomplished in several ways. Chromatographic separations are determined by distribution coefficients which are proportional to the peaks in an elution sequence. The distribution coefficients of the various polyhydroxy-borate complex ions in an anion resin exchange column and in equilibrium therewith, of course, depend on the ratio of distribution of the complex ions between the solution and the exchange column.

The distribution coefficients of polyhydroxy-borate complex ions are almost exclusively determined by the degree to which the polyhydroxy substances complex with borate ions. The various factors that are believed to determine the degree to which various polyhydroxide substances will complex with borate ions to form various diols and didiols of different strengths, has already been briefly discussed.

Since the distribution coefficients of the complex ions are subject to control, we have separated the substances under discussion from exchangers by stepwise elution, using increasing amounts of an eluting solution having the same concentration of exchangeable ions as well as running in eluting solutions having increasing concentratios of exchangeable ions. The eluting solution may contain one or several exchangeable ions as broadly set forth in the examples.

Ordinarily, when working with unknown mixtures of plant sugars and sugar derivatives, it is preferable to use eluting solutions having extremely low concentrations of exchangeable ions. While the volume of eluting solutions required will be high, distinct separations are likely to occur.

Of course, if it is known that only one polyhydroxy-borate complex ion remains to be eluted, a sharp increase in concentration of exchangeable ions in the eluting solution will enable a quick separation to take place. Care must be taken that the pH of the influent is not excessively high, since degradations of various sugars is likely to occur rendering analysis and recovery difficult and often impossible.

Most of our separations of sugars and sugar alcohols were performed using Dowex-1 or Amberlite IRA 400, preferably converted to a substantially borate form as set forth herein, although numerous changes and modifications will suggest themselves to those skilled in the art.

Thus, we have briefly described our invention for separating sugars and sugar alcohols and believe that our broad invention is the separation of those various polyhydroxy substances having two or more OH groups on the same side of the molecule as represented by Fisher projection formulas, or those compounds capable of forming such a configuration through the mechanism of mutarotation. Briefly, the process includes the following indispensible steps: contacting an anion resin exchanger with polyhydroxy substances of the type described and borate ions of the concentration required, in an aqueous solution having a pH of substantially 7 or higher but not exceeding a pH of 10, and successively eluting from the column polyhydroxy-borate complex ions by running through the column in a stepwise fashion dilute aqueous solutions containing exchange ions, where the exchange ions contain a substantial amount of borate ions.

The various polyhydroxy-borate complex ions may be then identified individually by physical or chemical assay methods and the successive effluents collected separately for quantitative assaying. The free polyhydroxy substances may be obtained by the method disclosed herein. The eluting solution may contain a certain concentration of borate ions and a column may be eluted with such a solution with or without an increase in the concentration, depending on the particular problem encountered. Preferably, we chose to progressively increase the concentration of borate ions by minute amounts in one or more of the various ways set forth herein.

Although our examples are based on a laboratory scale, anyone skilled in the art can readily apply the techniques set forth herein to larger apparatuses suitable to industrial scales and the mesh sizes may be varied accordingly and the flow rate can also be varied.

We have proposed various theoretical explanations; however, it is to be understood these are not binding or exhaustive but are intended rather for the assistance of others skilled in the art to enable them more easily to apply our invention under widely varying conditions encountered in actual practice and to change and modify the particular embodiments and examples herein described as may be necessary or desirable under varying conditions. The theoretical statements and explanations are, of course, not conclusive and our invention is in no way dependent upon their correctness.

The following examples illustrate separations carried out in ion exchangers of the strong base type such as Dowex-1 or Dowex-2 (quaternary ammonium derivatives of a polystyrene resin) obtained from the Dow Chemical Company in 300 mesh beads. Unless otherwise indicated, the beads were received in the chloride form and converted to a substantially borate form as described above.

Figure 10:
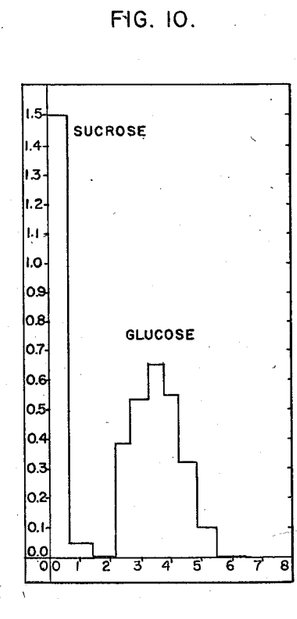

Except for the separation shown in Figure 10, and described in Example VIII, the rate of flow for the eluting solution was 1 ml./min./cm.$^2$ The rate of flow for the separation disclosed in Example VIII was 2 ml./min./cm.$^2$

EXAMPLE I

Figure 1:
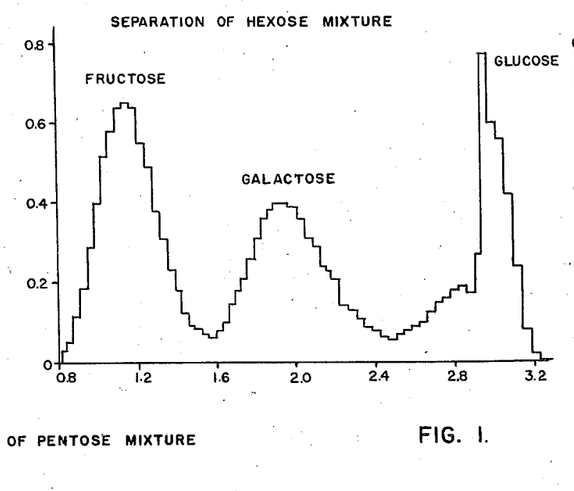

The separation of a hexose mixture is shown in Figure 1. The graph represents the concentration of sugar in each successive eluate as removed from the column (the ordinate) versus the volume of eluting agent through the column (the abscissa). The concentration of hexose was followed colorimetrically by the anthrone method i. e., by measuring the optical density of the color developed at 620 mu. The original mixture consisted of 10 mg. of each of fructose, galactose, and glucose dissolved in 10 ml. of 0.01 M potassium tetraborate and was sorbed on the resin column. Elution was carried out using a borate sodium 0.016 M with respect to $K_2B_4O_7$ to separate fructose, galactose, and part of the glucose. The remainder of glucose was eluted more rapidly with a borate solution 0.03 M with respect to $K_2B_4O_7$.

EXAMPLE II

Figure 2:
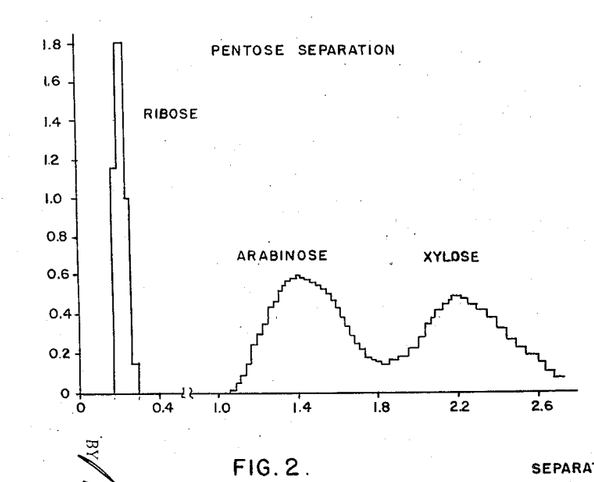
Figure 3:
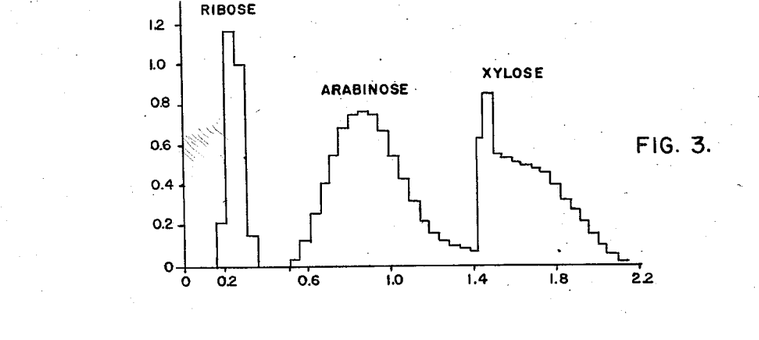

The separation of pentose mixtures using two procedures is illustrated in Figures 2 and 3. The graphs represent the concentration of sugar in each successive eluate as removed from the columns (the ordinate) versus the volume of eluting agent through the column (the abscissa). The concentration of pentose was followed colorimetrically by the orcinol method measuring the optical density of the color developed at 620 mu. For each procedure of this example, 10 mg. each of ribose, arabinose, and xylose dissolved in 10 ml. of 0.01 M $K_2B_4O_7$ and sorbed on a resin column. Eluting solutions and other conditions of the separations are noted in the legends accompanying the graphs.

EXAMPLE III

Figure 4:
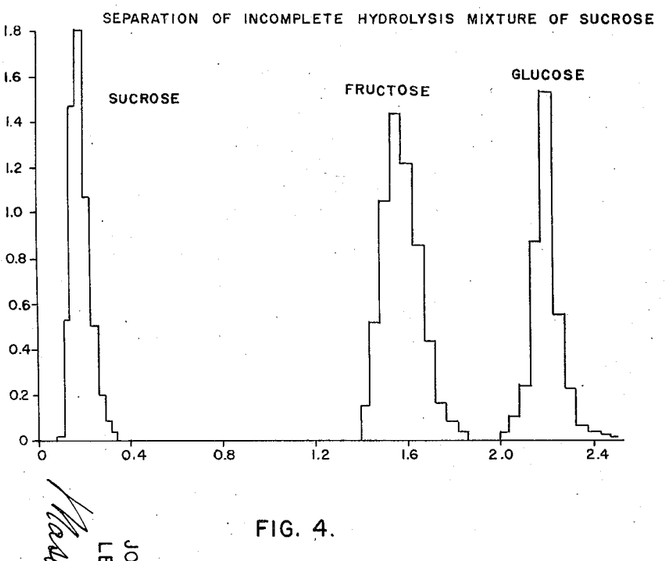

The separation of an incomplete hydrolysis mixture of sucrose is illustrated by Figure 4. The graph represents the concentration of sugar in each successive eluate as removed from the column (the ordinate) versus the volume of eluting agent through the column (the abscissa). Sucrose (25 mg.) was partially hydrolyzed using dilute $H_2SO_4$, then $Ba(OH)_2$ was added in slight excess to remove $SO_4$ as $BaSO_4$. The solution was then made 0.005 M in $K_2B_4O_7$ and allowed to flow through a column of strong base anion exchanger. The nonhydrolyzed sucrose may be separated from the hydrolytic products fructose and glucose as shown in Figure 4. Elution was carried out by successively increasing the concentration of the eluting solution, from 0.005 M to 0.03 M with respect to $K_2B_4O_7$ at the points indicated in Figure 4. The exact point at which these different concentrations are stopped or started is not critical, as long as they are changed before or after a peak. Different concentrations of $K_2B_4O_7$ could also be used that would yield a clean separation, 0.02 M $K_2B_4O_7$ could be used directly after the test solution had been sorbed on the column to elute cleanly first sucrose, then fructose; 0.03 M $K_2B_4O_7$ could then be started to remove at a faster rate any glucose which remains on the column. The reason for starting with dilute $K_2B_4O_7$ solutions and gradually increasing the concentration is to look for unknown and unexpected sugars during exploratory runs.

EXAMPLE IV

Figure 5:
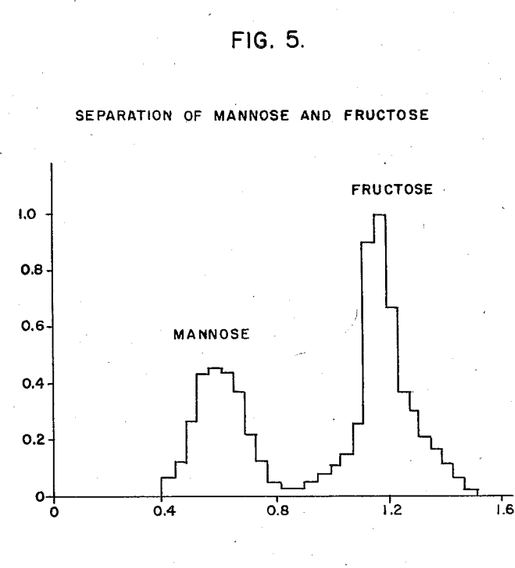

The separation of the hexoses, mannose and fructose, is illustrated by Figure 5. The graph represents the concentration of sugar in each successive eluate as removed from the column (the ordinate) versus the volume of eluting agent through the column (the abscissa). The concentration of hexose was followed colorimetrically by the anthrone method measuring the optical density of the color developed at 620 mu. In this example, 10 mg. each of fructose and mannose in 10 ml. of 0.01 M $K_2B_4O_7$ was sorbed on a column of Dowex-1. Eluting solutions and other conditions of the separation are noted in the legends accompanying the graph.

EXAMPLE V

Figure 6:
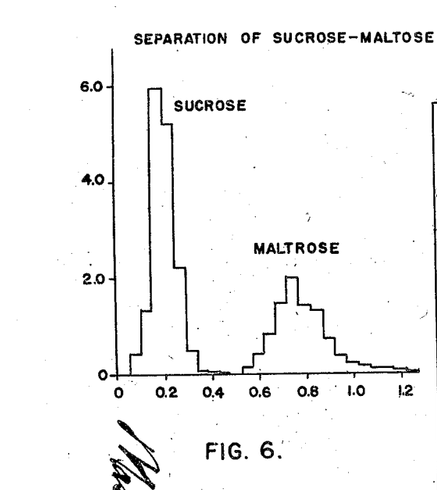

The separation of two disaccharides is shown in Figure 6. The graph represents the concentration of sugar in each successive eluate as removed from the column (the ordinates) versus the volume of eluting agent through the column (the abscissa). The concentration of the disaccharides was followed colorimetrically by the anthrone method, i. e. by measuring the optical density of the color developed at 620 mu. In this example, 25 mg. each of sucrose and maltose in 10 ml. of 0.001 M $K_2B_4O_7$ was sorbed on a column of Dowex-1. Elution was carried out by using 0.005 M $K_2B_4O_7$ to remove and separate the two disaccharides. Other conditions of the separation are noted in the legends accompanying the graph.

EXAMPLE VI

Figure 7:
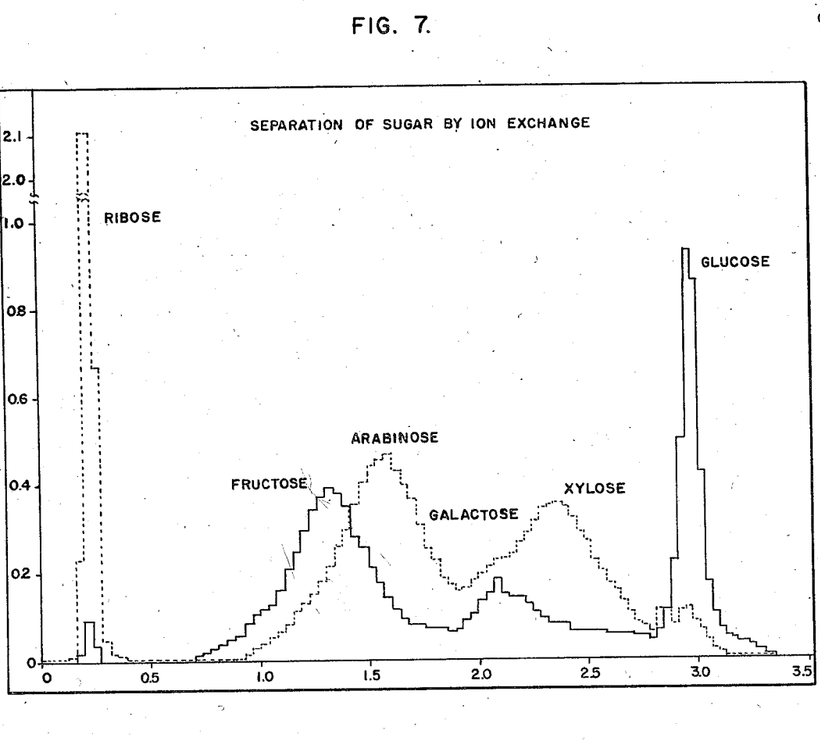

The assay of a hexose-pentose mixture of six sugars is illustrated by Figure 7. The graph represents the concentration of sugar in each successive eluate as removed from the column (the ordinate) versus the volume of eluting agent through the column (the abscissa). The concentration of the pentoses (ribose, arabinose, and xylose) was followed colorimetrically by the orcinol method (dotted lines in Figure 7) measuring the optical density of the color developed at 620 mu, and the concentration of hexose was followed colorimetrically by the anthrone method (solid lines in Figure 7) measuring the optical density of the color developed at 620 mu. In this example, 2.5 mg. ribose, 5 mg. fructose, 5 mg. galactose, 5 mg. glucose, 5 mg. xylose, and 5 mg. arabinose in 10 ml. 0.01 M $K_2B_4O_7$ were sorbed on a column of Dowex-2. Eluting agent and other conditions of the separation are noted in the legends accompanying Figure 7. Even though a complete separation of all the hexoses and pentoses in this example was not obtained, the identification and approximate assay of the mixture was made by a combination of the orcinol and anthrone color tests. Both tests were made on each fraction as removed from the column and the degree of cross-interference by applying both tests to a given hexose-pentose pair is not too great if the concentration of the sugar is of the same order of magnitude as seen in Figure 7.

EXAMPLE VII

Figure 8:
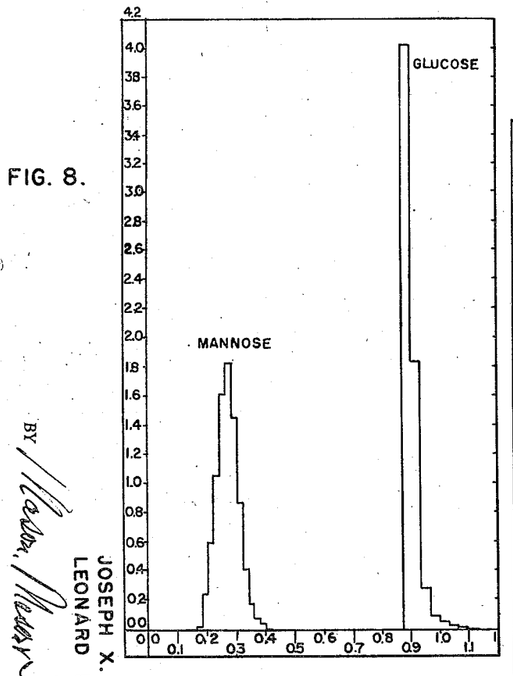
Figure 9:
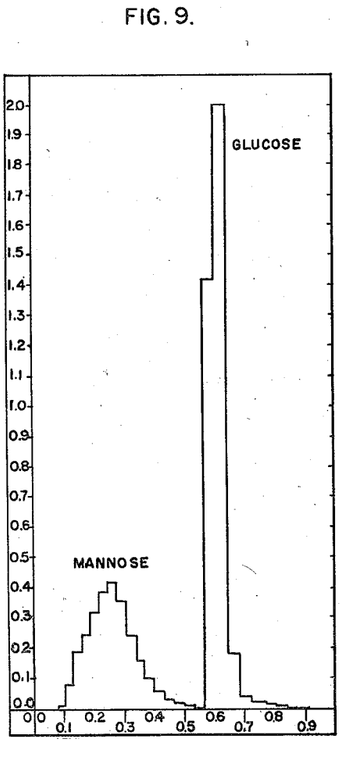

The separation of mannose and glucose is illustrated in Figure 8. The graph represents the concentration of sugar in each successive eluate as removed from the column (the ordinate) versus the volume of eluting agent through the column (the abscissa). The concentration was followed colorimetrically by the anthrone method as in the examples above. The important embodiment in this example is to point out the range of concentration and pH of the eluting agent that can be used to make a certain desired separation. Here 5 mg. each of glucose and mannose in 10 ml. of 0.01 M $K_2B_4O_7$ were sorbed on a column of Dowex-1 in the borate form as in the other examples. Mannose was easily removed at the pH of 0.1 M $H_3BO_3$ used initially as the eluting agent. After the mannose has been removed glucose may be removed rapidly by changing to 0.1 M $K_2B_4O_7$ as the eluting agent. The same separation can be obtained by removing the mannose (Figure 9) at pH 7.0 using 0.1 M $H_3BO_3$ and 0.00066 M $K_2B_4O_7$ as the initial eluting agent then again changing to 0.1 M $K_2B_4O_7$ to remove glucose after all the mannose has been removed.

EXAMPLE VIII

In this example, it will be seen that a completely borated column of resin is not essential to some types of separation. Figure 10 illustrates a separation of sucrose and glucose made on a column of Dowex-1 that had previously been conditioned with a mixture of 0.01 M sodium formate and 0.001 M $K_2B_4O_7$. Essentially then, the exchanger was in the formate form. The graph represents the same connotation as in other examples, the concentration of sugar being determined colorimetrically by the anthrone method. In this example, 5 mg. of sucrose and 10 mg. of glucose were dissolved in 10 ml. of 0.01 M $K_2B_4O_7$. Before passage of this sample on the exchanger, the liquid head above the exchanger was also made 0.01 M $K_2B_4O_7$. The test material was then allowed to pass through the column and this was followed by 10 ml. of 0.01 M $K_2B_4O_7$. Elution with a mixture of 0.01 M sodium formate and 0.001 M $K_2B_4O_7$ was used as the eluting agent. Figure 10 shows the clear cut separation of sucrose and glucose that resulted.

EXAMPLE IX

Figure 11:
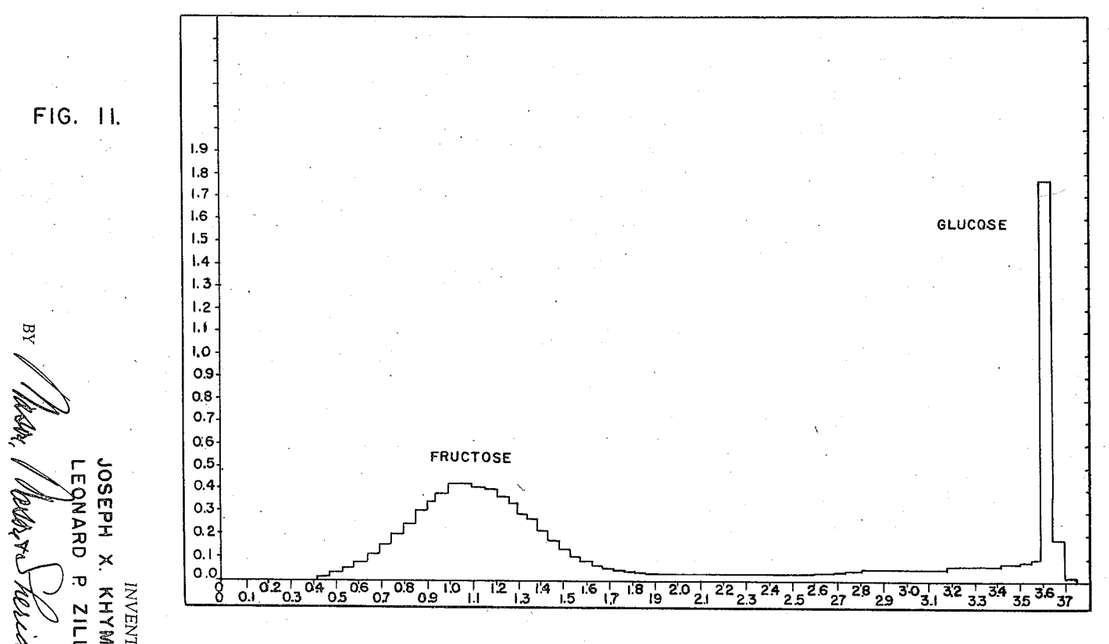

When using the more preferred method of separating, namely that which utilizes a substantially completely borated resin column, it is not always essential that the initial test material be dissolved in dilute borate solution prior to sorption on the resin column. Glucose and fructose were dissolved in water alone, and were then passed through the borate column in the borate form, then washed on with water and were sorbed. Elution was carried out in the usual manner using 0.015 M $K_2B_4O_7$, to elute fructose before changing to a stronger concentration of $K_2B_4O_7$ to elute glucose after all the fructose is eluted. In this example, Dowex-1 in the borate form was washed with water, then 10 mg. each of fructose and glucose in 5 ml. of water were put through the column and washed with 10 ml. of water. Eluting was carried out as above and a clear-cut separation resulted as indicated in Figure 11.

Figure 12:
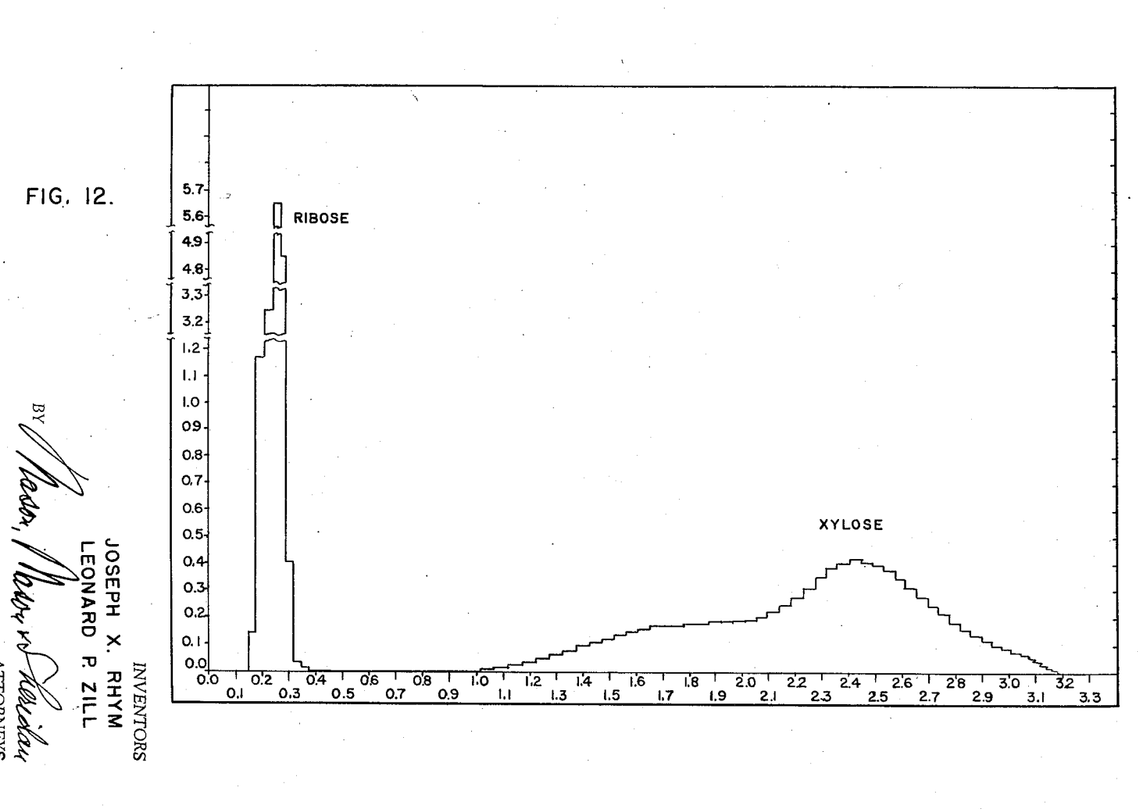

10 mg. each of ribose and xylose were treated in a similar way as the hexoses above and also separated cleanly as indicated in Figure 12.

EXAMPLE X

Figure 13:
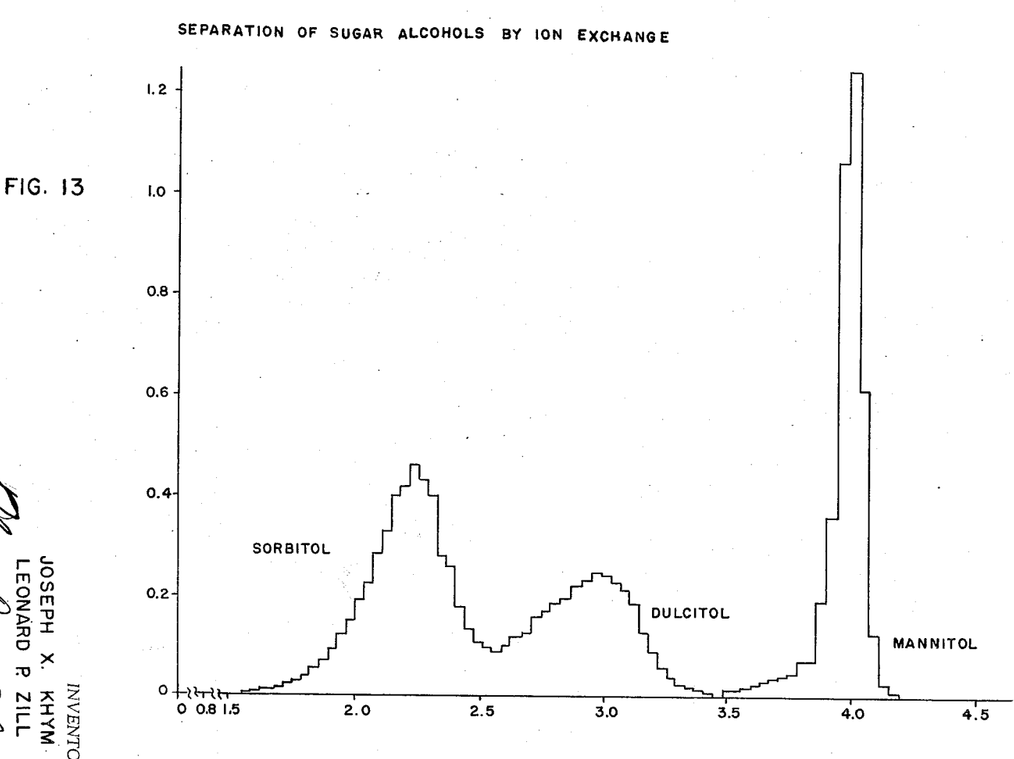

Separation of sugar alcohols is illustrated in Figure 13. The graph represents the concentration of sugar alcohol in each successive eluate as removed from the column (the ordinate) versuses the volume of eluting agent through the column (the abscissa). The concentration of sugar-alcohol was followed colorimetrically by the chromotropic-acid test method and by measuring the optical density of the color developed at 565 mu. In this example, 10 mg. each of mannitol, sorbitol and ducitol in 10 ml. 0.01 M $K_2B_4O_7$ were sorbed on a column of Dowex-2, which had previously been conditioned to the borate form. Eluting solutions and other conditions of the separation are noted in the legends accompanying Figure 13.

We claim:

1. In a process for separating those polyhydroxy substances capable of uniting with borate ions to form charged polyhydroxy borate complex ions, the steps of contacting an aqueous solution containing borate ions and those polyhydroxy substances of the group consisting of sugars, sugar alcohols and glycosides with a basic anion exchange resin to sorb complex ions formed by the reaction between said polyhydroxy substances and said borate ions on said resin, displacing the sorbed complex ions from said resin by step-wise eluting with increasing amounts of an aqueous solution having a pH from 6.5 to 10 and containing exchangeable ions, the exchangeable ions including a substantial amount of borate ions, and collecting successive portions of the resultant eluate.

2. The method of claim 1 in which the displaced complex ions in solution are recovered in the order of displacement, treating the individual solutions with Dowex-50 in the hydrogen form, and then removing the borate ions as a volatile alcohol borate from the isolated complexes before crystallizing the polyhydroxy substances individually.

3. In a process for separating those polyhydroxy substances capable of uniting with borate ions to form charged polyhydroxy borate complex ions, the steps of contacting an aqueous solution containing borate ions and those polyhydroxy substances of the group consisting of sugars, sugar alcohols and glycosides with a basic anion exchange resin converted to the borate form to sorb complex ions formed by the reaction between said polyhydroxy substances and said borate ions on said resin, displacing the sorbed complex ions from said resin by step-wise eluting with increasing amounts of an aqueous solution having a pH from 6.5 to 10 and containing exchangeable ions, the exchangeable ions including a substantial amount of borate ions, and collecting successive portions of the resultant eluate.

4. In a process for separating those polyhydroxy substances capable of uniting with borate ions to form charged polyhydroxy borate complex ions, the steps of passing an aqueous solution containing borate ions and those polyhydroxy substances of the group consisting of sugars, sugar alcohols and glycosides in a column of a basic anion exchange resin to sorb negatively charged complex ions formed by the reaction between said polyhydroxy substances and said borate ions on said column, displacing the sorbed complex ions from said column by step-wise eluting with an aqueous solution having a pH from 6.5 to 10 and containing exchangeable ions, the exchangeable ions being predominately borate ions, progressively increasing the concentration of borate ions and collecting successive portions of the resultant eluate.

5. The method of claim 4 in which the displaced complex ions in solution are recovered in the order of displacement, treating the individual solutions with Dowex-50 in the hydrogen form, and then removing the borate ions as a volatile alcohol borate from the isolated complexes before crystallizing the polyhydroxy substances individually.

6. In a process for separating those polyhydroxy substances capable of uniting with borate ions to form charged polyhydroxy borate complex ions, the steps of passing an aqueous solution containing borate ions and those polyhydroxy substances of the group consisting of sugars, sugar alcohols and glycosides in a column of a basic anion exchange resin to sorb negatively charged complex ions formed by the reaction between said polyhydroxy substances and said borate ions on said column, displacing the sorbed complex ions from said column by step-wise eluting with an aqueous solution having a pH from 6.5 to 10 and containing exchangeable ions, the exchangeable ions being predominately borate ions, progressively increasing the pH of the eluting solution within the range of 6.5 to 10 and collecting successive portions of the resultant eluate.

7. In a process for separating those polyhydroxy substances capable of uniting with borate ions to form charged polyhydroxy borate complex ions, the steps of passing an aqueous solution containing borate ions and those polyhydroxy substances of the group consisting of sugars, sugar alcohols and glycosides in a column of a basic anion exchange resin converted to the borate form to sorb negatively charged complex ions formed by the reaction between said polyhydroxy substances and said borate ions on said column, displacing the sorbed complex ions from said column by step-wise eluting with an aqueous solution having a pH from 6.5 to 10 and containing exchangeable ions, the exchangeable ions being predominately borate ions, progressively increasing the concentration of borate ions and collecting successive portions of the resultant eluate.

8. In a process for separating those polyhydroxy substances capable of uniting with borate ions to form charged polyhydroxy borate complex ions, the steps of passing an aqueous solution containing borate ions and those polyhydroxy substances of the group consisting of sugars, sugar alcohols and glycosides in a column of a basic anion exchange resin converted to the borate form to sorb negatively charged complex ions formed by the reaction between said polyhydroxy substances and said borate ions on said column, displacing the sorbed complex ions from said column by step-wise eluting with an aqueous solution having a pH from 6.5 to 10 containing exchangeable ions, the exchangeable ions being predominately borate ions, progressively increasing the pH of the eluting solution within the range of 6.5 to 10 and collecting successive portions of the resultant eluate.

9. In a process for individually separating those polyhydroxy substances capable of uniting with borate ions to form charged polyhydroxy borate complex ions, the steps of contacting an aqueous solution containing borate ions and those polyhydroxy substances of the group consisting of sugars, sugar alcohols and glycosides with a basic anion exchange resin to sorb complex ions formed by the reaction between said polyhydroxy substances and said borate ions on said resin, displacing the sorbed complex ions from said resin by step-wise eluting with increasing amounts of an aqueous solution having a pH from 6.5 to 10 and containing exchangeable ions, the exchangeable ions being predominately borate ions produced from a highly ionized borate salt and collecting successive portions of the resultant eluate.

10. The method of claim 7 in which the displaced complex ions in solution are recovered in the order of displacement, treating the individual solutions with Dowex-50 in the hydrogen form, and then removing the borate ions as a volatile alcohol borate from the isolated complexes before crystallizing the polyhydroxy substances individually.

11. In a process for individually separating those polyhydroxy substances capable of uniting with borate ions to form charged polyhydroxy borate complex ions, the steps of contacting an aqueous solution containing borate ions and those polyhydroxy substances of the group consisting of sugars, sugar alcohols and glycosides with a basic anion exchange resin to sorb complex ions formed by the reaction between said polyhydroxy substances and said borate ions on said resin, displacing the sorbed complex ions from said resin by step-wise eluting with an aqueous solution having a pH from 6.5 to 10 and containing exchangeable ions, the exchangeable ions being predominately borate ions produced from a highly ionized borate salt, progressively increasing the pH of the eluting solution within the range of 6.5 to 10, and collecting successive portions of the resultant eluate.

12. In a process for individually separating those polyhydroxy substances capable of uniting with borate ions to form charged polyhydroxy borate complex ions, the steps of contacting an aqueous solution containing borate ions and those polyhydroxy substances of the group consisting of sugars, sugar alcohols and glycosides with a basic anion exchange resin to sorb complex ions formed by the reaction between said polyhydroxy substances and said borate ions on said resin, displacing the sorbed complex ions from said resin by step-wise eluting with an aqueous solution having a pH from 6.5 to 10 and containing exchangeable ions, the exchangeable ions being predominately borate ions produced from a highly ionized borate salt, progressively increasing the concentration of the borate ions in the eluting solutions, and collecting successive portions of the resultant eluate.

13. In a process for separating those monosaccharides capable of uniting with borate ions to form charged monosaccharide-borate complex ions, the steps of contacting an aqueous solution containing those monosaccharides with borate ions and a basic anion exchange resin to sorb on said exchange resin those negatively charged complex ions formed by the reaction between said monosaccharides and said borate ions, displacing the sorbed complex ions on said resin by step-wise eluting with increasing amounts of aqueous solutions containing exchangeable ions, the exchangeable ions being predominately borate ions, progressively increasing the pH of the eluting solutions within the range of 6.5 to 10, and collecting successive portions of the resultant eluate.

14. The method of claim 13 in which the displaced complex ions in solution are recovered in the order of displacement, treating the individual solutions with Dowex-50 in the hydrogen form, and then removing the borate ions as a volatile alcohol borate from the isolated complexes before crystallizing the monosaccharides individually.

15. In a process for separating those monosaccharides capable of uniting with borate ions to form charged monosaccharide-borate complex ions, the steps of contacting an aqueous solution containing those monosaccharides with borate ions and a basic anion exchange resin to sorb on said exchange resin those negatively charged complex ions formed by the reaction between said monosaccharides and said ions, displacing the sorbed complex ions on said resin by step-wise eluting with increasing amounts of aqueous solutions having a pH from 6.5 to 10 and containing exchangeable ions, the exchangeable ions being predominately borate ions, progressively increasing the concentration of borate ions in the eluting solutions and collecting successive portions of the resultant eluate.

16. The method of claim 15 in which the displaced complex ions in solution are recovered in the order of displacement, treating the individual solutions with Dowex-50 in the hydrogen form, and then removing the borate ions as a volatile alcohol borate from the isolated complexes before crystallizing the monosaccharides individually.

17. In a process for separating those polysaccharides capable of uniting with borate ions to form charged polysaccharide-borate complex ions, the steps of contacting an aqueous solution containing those polysaccharides with borate ions and a basic anion exchange resin to sorb on said exchange resin those negatively charged complex ions formed by the reaction between said polysaccharides and said borate ions, displacing the sorbed complex ions on said resin by step-wise eluting with increasing amounts of aqueous solutions containing exchangeable ions, the exchangeable ions being predominately borate ions, progressively increasing the pH of the eluting solutions within the range of 6.5 to 10, and collecting successive portions of the resultant eluate.

18. The method of claim 17 in which the displaced complex ions in solution are recovered in the order of displacement, treating the individual solutions with Dowex-50 in the hydrogen form, and then removing the borate ions as a volatile alcohol borate from the isolated complexes before crystallizing the polysaccharides individually.

19. In a process for separating those polysaccharides capable of uniting with borate ions to form charged polysaccharide-borate complex ions, the steps of contacting an aqueous solution containing those polysaccharides with borate ions and a basic anion exchange resin to sorb on said exchange resin those negatively charged complex ions formed by the reaction between said polysaccharides and said ions, displacing the sorbed complex ions on said resin by step-wise eluting with increasing amounts of aqueous solutions having a pH from 6.5 to 10 and containing exchangeable ions, the exchangeable ions being predominately borate ions, progressively increasing the concentration of borate ions in the eluting solutions and collecting successive portions of the resultant eluate.

20. The method of claim 19 in which the displaced complex ions in solution are recovered in the order of displacement, treating the individual solutions with Dowex-50 in the hydrogen form, and then removing the borate ions as a volatile alcohol borate from the isolated complexes before crystallizing the polysaccharides individually.

References Cited in the file of this patent

UNITED STATES PATENTS

| | | |
|---|---|---|
| 2,504,169 | Wolfrom et al. | Apr. 18, 1950 |
| 2,524,414 | Wolfrom et al. | Oct. 3, 1950 |

OTHER REFERENCES

Amberlite IRA 410, Laboratory Manual, Rohm and Haas Co., Washington Square, Philadelphia, Pa., The Resinous Products Div., March 1950, (8 pp.).